(12) United States Patent
Yoshida

(10) Patent No.: US 7,268,810 B2
(45) Date of Patent: Sep. 11, 2007

(54) DIGITAL CAMERA FOR CHANGING A RECORDING SIZE TO A HIGH-SENSITIVITY COMPATIBLE RECORDING SIZE

(75) Inventor: Masanori Yoshida, Asaka (JP)

(73) Assignee: Fujifilm Corporation, Tokyo (JP)

( * ) Notice: Subject to any disclaimer, the term of this patent is extended or adjusted under 35 U.S.C. 154(b) by 984 days.

(21) Appl. No.: 10/352,877

(22) Filed: Jan. 29, 2003

(65) Prior Publication Data

US 2003/0151687 A1     Aug. 14, 2003

(30) Foreign Application Priority Data

Jan. 29, 2002   (JP)   .............. 2002-020464
Jan. 29, 2002   (JP)   .............. 2002-020473

(51) Int. Cl.
*H04N 5/262*    (2006.01)
*H04N 5/222*    (2006.01)

(52) U.S. Cl. .............. 348/240.2; 348/333.02; 348/333.05

(58) Field of Classification Search ............ None
See application file for complete search history.

(56) References Cited

U.S. PATENT DOCUMENTS 6,999,119 B1 *    2/2006    Shibazaki et al. .......... 348/273

FOREIGN PATENT DOCUMENTS

JP    6-165048 A    6/1994
JP    8-76238 A     3/1996

* cited by examiner

*Primary Examiner*—Lin Ye
*Assistant Examiner*—Anthony J. Daniels
(74) *Attorney, Agent, or Firm*—Birch, Stewart, Kolasch & Birch, LLP

(57) ABSTRACT

The present invention provides a digital camera that prevents photographing errors attributed to an increase in sensitivity effected by reducing the recordable image size. In a digital camera that allows a high sensitivity to be set by pixel mixture, a display is provided to prevent photographing errors caused by restrictions or the like resulting from setting of a high sensitivity.

7 Claims, 7 Drawing Sheets

DIGITAL CAMERA FOR CHANGING A RECORDING SIZE TO A HIGH-SENSITIVITY COMPATIBLE RECORDING SIZE

BACKGROUND OF THE INVENTION

1. Field of the Invention

The present invention relates to a digital camera that takes a photograph by forming an image of an object on a solid imaging device.

2. Description of the Related Art

Because of the reduced size and costs of their unit light receiving elements, digital cameras have recently been popular which take a photograph by forming an image of an object on a solid imaging device composed of a set of a plurality of two-dimensionally arranged unit light receiving elements to obtain image data representing this object. These digital cameras control exposure according to sensitivity set by, for example, selecting an ISO (International Organization for Standardization) value from a menu display.

If a high sensitivity is set, some of these digital cameras actualize this high sensitivity by increasing the time for which charges remain stored in the solid imaging device (for example, refer to Japanese Patent Laid-Open No. 6-165048). Other digital cameras actualize this high sensitivity by carrying out pixel mixture in which a plurality of pieces of luminance information obtained from a plurality of unit light receiving elements are integrated together so that one new piece of luminance information is formed of every predetermined number of pieces of luminance information obtained from a predetermined number of adjacent unit light receiving elements. It is assumed that in the digital camera actualizing a high sensitivity through this pixel mixture, for example, the charged coupled device is composed of 6,000,000 unit light receiving elements, i.e. recordable image size is 6 mega-pixels. Then, when high-sensitivity photographing corresponding to ISO 800 is specified, four unit light receiving elements are integrated together into one unit light receiving element. Thus, the recordable image size becomes 1.5 mega-pixels.

However, a large number of users are unfamiliar with such correlationship between the sensitivity setting and the recordable image size. Accordingly, for example, with a digital camera having a recordable image size of 6 mega-pixels, when a high sensitivity is set if an image is to be recorded so as to have an image size of 3 mega-pixels, the recordable image size becomes 1.5 mega-pixels. Consequently, a photographing process is not executed with the set recording image size (3 mega-pixels). As a result, the image quality of the resulting photograph is disadvantageously lower than intended.

SUMMARY OF THE INVENTION

In view of the above-described circumstances, it is an object of the present invention to provide a digital camera that prevents photographing errors attributed to an increase in sensitivity effected by reducing recordable image size.

To attain this object, a first digital camera according to the present invention obtains image data representing an object by forming an image of the object on a solid imaging device comprising a set of a plurality of two-dimensionally arranged unit light receiving elements, controls exposure according to a set sensitivity, and has:

a sensitivity setting operation member which sets sensitivity;

an image size setting operation member which sets a recording image size;

a pixel mixing section which operates if the sensitivity setting operation member is operated to set a predetermined sensitivity, to execute a pixel mixing process on a plurality of pieces of luminance information obtained from the plurality of unit light receiving elements constituting the solid imaging device, the pixel mixing process comprising integrating the plurality of pieces of luminance information together so that one new piece of luminance information is formed of every predetermined number of pieces of luminance information obtained from a predetermined number of adjacent unit light receiving elements, the pixel mixing section thus reducing a recordable image size to a predetermined high-sensitivity-compatible image size to realize the predetermined high sensitivity;

an image size setting section which sets the recording image size according to an operation of the image size setting operation member and if a recording image size larger than the high-sensitivity-compatible image size has previously been set, changes the recording image size to the high-sensitivity-compatible image size in response to setting of the predetermined high sensitivity carried out by operating the high-sensitivity setting operation member; and a display section which indicates that the recording image size has been changed to the high-sensitivity-compatible image size if the image size setting section changes the recording image size to the high-sensitivity-compatible image size in response to the setting of the predetermined high sensitivity carried out by operating the sensitivity setting operation member.

With the first digital camera of the present invention, when the predetermined high sensitivity is set, the pixel mixture is carried out to reduce the recordable image size to the high-sensitivity-compatible image size. Accordingly, if the recording image size set before this predetermined high sensitivity is set is larger than this high-sensitivity-compatible image size, the recording image size is changed to the high-sensitivity-compatible image size. Further, an indication is provided which means that the current recording image size has been changed to a value smaller than the set one. Therefore, according to the first digital camera of the present invention, if the recording image size is changed by setting the predetermined high sensitivity, a user is informed of this before photographing. This prevents photographing errors attributed to an increase in sensitivity effected by reducing the recordable image size.

To attain the above object, a second digital camera of the present invention obtains image data representing an object by forming an image of the object on a solid imaging device comprising a set of a plurality of two-dimensionally arranged unit light receiving elements, controls exposure according to a set sensitivity, and has:

a sensitivity setting operation member which sets sensitivity;

an image size setting operation member which sets a recording image size;

a pixel mixing section which operates if the sensitivity setting operation member is operated to set a predetermined sensitivity, to execute a pixel mixing process on a plurality of pieces of luminance information obtained from the plurality of unit light receiving elements constituting the solid imaging device, the pixel mixing process comprising integrating the plurality of pieces of luminance information together so that one new piece of luminance information is formed of every predetermined number of pieces of luminance information obtained from a predetermined number of adjacent unit light receiving elements, the pixel mixing section thus reducing a recordable image size to a predetermined high-sensitivity-compatible image size to realize the predetermined high sensitivity;

an image size setting section which sets the recording image size according to an operation of the image size setting operation member and if a recording image size larger than the high-sensitivity-compatible image size has previously been set, changes the recording image size to the high-sensitivity-compatible image size in response to setting of the predetermined high sensitivity carried out by operating the sensitivity setting operation member; and a display section which indicates that the predetermined high sensitivity has been set during a state in which the predetermined high sensitivity remains set.

With the second digital camera of the present invention, the above configuration maintains an indication meaning that sensitivity has been set at the predetermined high sensitivity value until this setting is cleared. According to the second digital camera of the present invention, the user's attention is always called to the fact that the current sensitivity is set at the predetermined high sensitivity value, thus preventing a misunderstanding about the recording image size. This in turn prevents photographing errors attributed to an increase in sensitivity effected by reducing the recordable image size.

To attain the above object, a third digital camera of the present invention obtains image data representing an object by forming an image of the object on a solid imaging device comprising a set of a plurality of two-dimensionally arranged unit light receiving elements, controls exposure according to a set sensitivity, and has:

a sensitivity setting operation member which sets sensitivity;

an image size setting operation member which sets a recording image size;

a pixel mixing section which operates if the sensitivity setting operation member is operated to set a predetermined sensitivity, to execute a pixel mixing process on a plurality of pieces of luminance information obtained from the plurality of unit light receiving elements constituting the solid imaging device, the pixel mixing process comprising integrating the plurality of pieces of luminance information together so that one new piece of luminance information is formed of every predetermined number of pieces of luminance information obtained from a predetermined number of adjacent unit light receiving elements, the pixel mixing section thus reducing a recordable image size to a predetermined high-sensitivity-compatible image size to realize the predetermined high sensitivity;

an image size setting section which sets the recording image size according to an operation of the image size setting operation member and if a recording image size larger than the high-sensitivity-compatible image size has previously been set, changes the recording image size to the high-sensitivity-compatible image size in response to setting of the predetermined high sensitivity carried out by operating the sensitivity setting operation member;

an electronic zoom operation section which implements an electronic zoom function in which the high-sensitivity-compatible image size is a maximum enlarged size; and a display section which indicates that the electronic zoom function is disabled if the image size setting section changes the recording image size to the high-sensitivity-compatible image size in response to the setting of the predetermined high sensitivity carried out by operating the sensitivity setting operation member.

With the third digital camera of the present invention, the electronic zoom function is available only if the image size, determined by an enlargement range set on the solid imaging device, is larger than the high-sensitivity-compatible image size, in order to prevent image quality from being degraded. Thus, with the third digital camera of the present invention, when the predetermined high sensitivity is set, both the recordable image size on the solid imaging device and the set recording image size change to the high-sensitivity-compatible image size, and thus the electronic zoom function is disabled and the indication of the electronic zoom function being disabled is made. Therefore, according to the third digital camera of the present invention, before taking a photograph, the user is informed that the electronic zoom function is disabled if the predetermined high sensitivity is set. This prevents photographing errors attributed to an increase in sensitivity effected by reducing the recordable image size.

To attain the above object, a fourth digital camera of the present invention obtains image data representing an object by forming an image of the object on a solid imaging device comprising a set of a plurality of two-dimensionally arranged unit light receiving elements, controls exposure according to a set sensitivity, and has:

a sensitivity setting operation member which sets sensitivity;

an image size setting operation member which sets a recording image size;

a photographing mode selecting operation member which selects a photograph mode;

a pixel mixing section which operates if the photographing mode selecting operation member is operated to select a predetermined high-sensitivity-compatible photographing mode and the sensitivity setting operation member is operated to set a predetermined sensitivity to execute a pixel mixing process on a plurality of pieces of luminance information obtained from the plurality of unit light receiving elements constituting the solid imaging device, the pixel mixing process comprising integrating the plurality of pieces of luminance information together so that one new piece of luminance information is formed of every predetermined number of pieces of luminance information obtained from a predetermined number of adjacent unit light receiving elements, the pixel mixing section thus reducing a recordable image size to a predetermined high-sensitivity-compatible image size to realize the predetermined high sensitivity; and a sensitivity setting section which sets sensitivity according to an operation of the sensitivity setting operation member, and returns sensitivity to a predetermined initial value if the photographing mode selecting operation member is operated to set sensitivity and to select a photographing mode different from the previously selected high-sensitivity-compatible photographing mode.

With the fourth digital camera of the present invention, the above configuration prevents the predetermined high sensitivity set in the high-sensitivity-compatible photographing mode from being mistakenly kept in modes other than the high-sensitivity-compatible photographing mode. Therefore, according to the fourth digital camera of the present invention, it is possible to avoid unintentionally changing sensitivity always used in the modes other than the high-sensitivity-compatible photographing mode. This prevents photographing errors attributed to an increase in sensitivity effected by reducing the recordable image size.

Here, preferably, in the high-sensitivity-compatible photographing mode, if the high-sensitivity setting operation member is operated to change a previously set normal sensitivity to the predetermined high sensitivity and then the photographing mode selecting operation member is operated to select a photographing mode different from the previously selected high-sensitivity-compatible photographing mode, then the sensitivity setting section of the fourth digital camera of the present invention returns sensitivity to the initial value. Subsequently, if the photographing mode selecting operation member is operated to select the high-sensitivity-compatible photographing mode again, the sensitivity setting section sets sensitivity to the normal sensitivity value.

This is convenient if any normal sensitivity is always used in the high-sensitivity-compatible photographing mode.

To attain the above object, a fifth digital camera of the present invention obtains image data representing an object by forming an image of the object on a solid imaging device comprising a set of a plurality of two-dimensionally arranged unit light receiving elements, controls exposure according to a set sensitivity, and has:

a sensitivity setting operation member which sets sensitivity;

an image size setting operation member which sets a recording image size;

a pixel mixing section which operates if the sensitivity setting operation member is operated to set a predetermined sensitivity, to execute a pixel mixing process on a plurality of pieces of luminance information obtained from the plurality of unit light receiving elements constituting the solid imaging device, the pixel mixing process comprising integrating the plurality of pieces of luminance information together so that one new piece of luminance information is formed of every predetermined number of pieces of luminance information obtained from a predetermined number of adjacent unit light receiving elements, the pixel mixing section thus reducing a recordable image size to a predetermined high-sensitivity-compatible image size to realize the predetermined high sensitivity;

an image size setting section which has a setting screen which displays a settable recording image size when the image size setting operation member is operated to set the recording image size, the image size setting section changing display on the setting screen in connection with the operation of the image size setting operation member to set the recording image size according to the operation of the image size setting operation member, and wherein the image size setting section indicates that only the high-sensitivity-compatible image size can be set on the setting screen if the sensitivity setting operation member has been operated to set the predetermined high sensitivity.

With the fifth digital camera of the present invention, the above configuration carries out pixel mixture to reduce the recordable image size to the high-sensitivity-compatible image size when the predetermined high sensitivity is set. Accordingly, even if a recording image size exceeding the high-sensitivity-compatible image size is set, image data is actually recorded only with this high sensitivity-compatible image size. Consequently, a setting screen that allows the setting of the recording image size indicates that the settable image recording image size is only the high-sensitivity-compatible image size. Therefore, according to the fifth digital camera, the user realizes the limitation of the recording image size associated with the setting of the predetermined high sensitivity, on the setting screen that allows the setting of the recording image size. This prevents photographing errors attributed to an increase in sensitivity effected by reducing the recordable image size.

To attain the above object, a sixth digital camera of the present invention obtains image data representing an object by forming an image of the object on a solid imaging device comprising a set of a plurality of two-dimensionally arranged unit light receiving elements, controls exposure according to a set sensitivity, and has:

a sensitivity setting operation member which sets sensitivity;

an image size setting operation member which sets a recording image size;

a pixel mixing section which operates if the sensitivity setting operation member is operated to set a predetermined sensitivity, to execute a pixel mixing process on a plurality of pieces of luminance information obtained from the plurality of unit light receiving elements constituting the solid imaging device, the pixel mixing process comprising integrating the plurality of pieces of luminance information together so that one new piece of luminance information is made of every predetermined number of pieces of luminance information obtained from a predetermined number of adjacent unit light receiving elements, the pixel mixing section thus reducing a recordable image size to a predetermined high-sensitivity-compatible image size to realize the predetermined high sensitivity;

an image size setting section which has a setting screen which displays a settable recording image size when the image size setting operation member is operated to set the recording image size, the image size setting section changing display on the setting screen in connection with the operation of the image size setting operation member to set the recording image size according to the operation of the image size setting operation member; and an electronic zoom operation section which implements an electronic zoom function in which the high-sensitivity-compatible image size is a maximum enlarged size, and wherein the image size setting section indicates that the electronic zoom function is disabled if the sensitivity setting operation member has been operated to set the predetermined high sensitivity.

With the sixth digital camera of the present invention, the electronic zoom function is available only if the image size, determined by the enlargement range set on the solid imaging device, is larger than the high-sensitivity-compatible image size, in order to prevent image quality from being degraded. Thus, with the sixth digital camera of the present invention, when the predetermined high sensitivity is set, both the recordable image size on the solid imaging device and the set recording image size change to the high-sensitivity-compatible image size value, and thus the electronic zoom function is disabled and the indication of the electronic zoom function being disabled is made. Therefore, according to the sixth digital camera of the present invention, on the setting screen that allows the setting of the recording image size, the user realizes that the electronic zoom function is disabled if the predetermined high sensitivity is set. This prevents photographing errors attributed to an increase in sensitivity effected by reducing the recordable image size.

Here, preferably, the fifth digital camera or sixth digital camera of the present invention controls exposure on the basis of a program diagram corresponding to a selected one of a plurality of photographing modes with different program diagrams, the digital camera comprises a photographing mode selecting operation member used to select a photographing mode, the pixel mixing section operates if the photographing mode selecting operation member is operated to select a predetermined high-sensitivity-compatible photographing mode and the high-sensitivity setting operation member is operated to set to the predetermined high sensitivity, and the digital camera comprises a sensitivity setting section which sets sensitivity according to an operation of the sensitivity setting operation member, and returns sensitivity to a predetermined initial sensitivity value if the photographing mode selecting operation member is operated to select a photographing mode different from a previously selected high-sensitivity-compatible photographing mode.

This prevents the predetermined high sensitivity set in the high-sensitivity-compatible photographing mode from being mistakenly kept in modes other than the high-sensitivity-compatible photographing mode. This in turn prevents an unintentional change of sensitivity always used in the modes other than the high-sensitivity-compatible photographing mode.

Furthermore, preferably, in the high-sensitivity-compatible photographing mode, if the sensitivity setting operation member is operated to change the previously set normal sensitivity to the predetermined high sensitivity and then the photographing mode selecting operation member is operated to select a photographing mode different from the previously selected high-sensitivity-compatible photographing mode, then the setting section of the fifth digital camera or sixth digital camera of the present invention returns sensitivity to the initial value. Subsequently, if the photographing mode selecting operation member is operated to select the high-sensitivity-compatible photographing mode again, the sensitivity setting section sets sensitivity to the normal value.

This is convenient if any normal sensitivity is always used in the high-sensitivity-compatible photographing mode.

As described above, the digital camera of the present invention prevents photographing errors attributed to an increase in sensitivity effected by reducing the recordable image size.

DETAILED DESCRIPTION OF THE PREFERRED EMBODIMENTS

Figure 1:
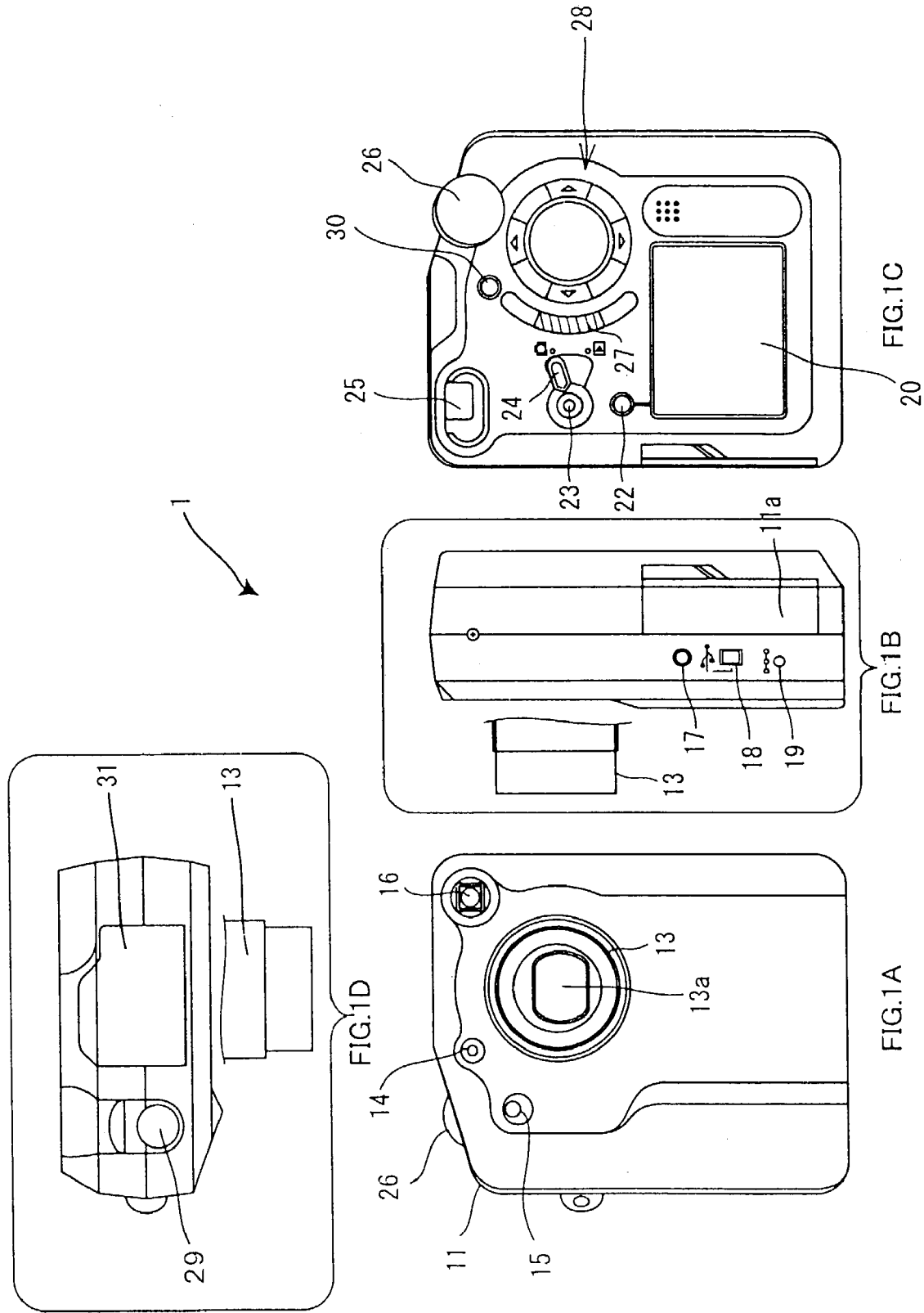
FIGS. 1A, 1B, 1C, and 1D are a front view, a left side view, a rear view, and a top view, respectively, of a digital camera 1 of the present embodiment.

Embodiments of digital camera of the present invention will be described below.

First, description will be given of an embodiment common to a first, second, third, and fourth digital cameras of the present invention.

FIGS. 1A to 1D are a front view, a left side view, a rear view, and a top view, respectively, of a digital camera 1 of this embodiment.

The front view in FIG. 1A shows a camera enclosure 11, a lens barrel 13 containing a photographing lens 13a, a finder objective window 16, a flash light receiving window 14, a self timer lamp 15 having a blink speed which varies depending on the time remaining before the start of a photographing process if a self timer function has been activated, and a photographing mode dial 26 that switches six types of photographing modes, described later. The flash light receiving window 14 is used to guide flash light to a flash light receiving sensor that detects the quantity of returning flash light reflected by an object during flash emission. The digital camera 1 is provided with a real-image type zoom finder.

The left side view in FIG. 1B shows not only the lens barrel 13 shown in FIG. 1A but also a video output terminal 17 used to output data on a photographed image to a projector or the like, a USB terminal 18 to which a universal serial bus (USB) cable is connected which is used to transmit this image data to a personal computer or the like, an external power terminal 19, and a battery cover 11a.

The rear view in FIG. 1C shows a liquid crystal panel 20 that displays images, a liquid crystal panel activation button 22 used to turn on and off image display on the liquid crystal panel, a finder ocular window 25, the previously described photographing mode dial 26, a cross key 28 operated to select a variation or carry out zooming, a menu/OK button 27 used to display menus on the liquid crystal panel and enter any of the menus, a flash device activation button 30 operated to allow a popup type flash device to pop up from the top surface of the camera enclosure for use, and a main switch 23.

Further, the rear view in FIG. 1C shows a function selection lever 24 operated to determine whether to select a "photographing and recording function" or "image data reproducing function" provided in the digital camera 1. When the function selection lever 24 is moved upward, the "photographing and recording function" is selected. When the function selection lever 24 is moved downward, the "image data reproducing function" is selected.

The top view in FIG. 1D shows not only the lens barrel 13 also shown in FIG. 1A but also a popup type flash device 31 and a release button 29.

The digital camera 1 of the present embodiment is, as described later in detail, a zoom-lens-containing digital still camera that employs a CCD (Charge Coupled Device) as a solid imaging device. A zoom function is used for both optical and electronic zooming. With the digital camera 1, when the main switch 23 is turned on, a lens cover (not shown) provided in the front surface of the camera so as to cover the lens is opened, and the lens barrel 13 is protruded to a predetermined position. When the main switch 23 is turned off, the protruded lens barrel 13 is sunk into the interior of the camera. Then, the photographing lens 13a is covered with the lens cover.

Figure 2:
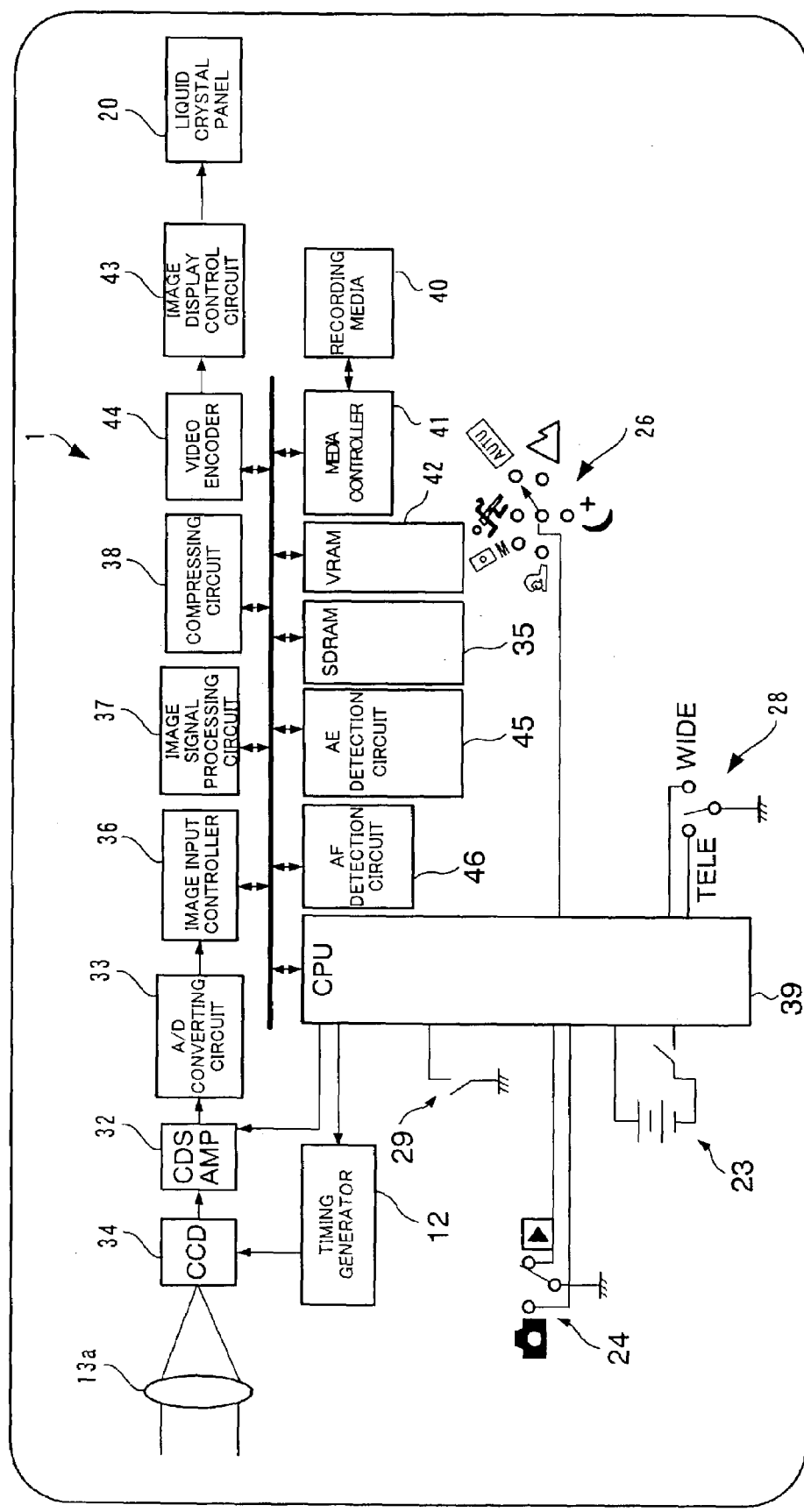
FIG. 2 is a block diagram of the interior of the digital camera of the present embodiment.

FIG. 2 is a block diagram showing the interior of the digital camera of the present embodiment. The digital camera 1 is provided with the flash device 31, an I/O port controller that receives signals from various switches and the USB terminal 18, the flash light receiving sensor, a motor driven to carry out optical zooming and focusing, a motor driver that controls the motor, and others. However, the illustration of these components in this figure is unrelated to the present invention and is thus omitted.

FIG. 2 shows a CPU 39 that controls the entire digital camera 1, a timing generator 12a that causes, according to an instruction from the CPU 39, an image sensor element 34 of the charge coupled device (CCD) type (hereinafter, the image sensor element of the CCD type is called "CCD") forming an image of an object through the photographing lens 13a to be driven to output an image signal representing the object image, an amplifier 32 that amplifies the output image signal, and an A/D converting circuit 33 that converts the image signal amplified by the amplifier 32 into digital image data.

FIG. 2 also shows a SDRAM 35 as a memory, an image input controller 36 that stores digital image data in the SDRAM 35, an image signal processing circuit 37 that processes the digital image data stored in the SDRAM 35 so that the data can be compressed, a compressing circuit 38 that compresses the digital image data processed so as to be compressed, a media controller 41 that records, on a recording media 40, the compressed digital image data, which has been converted into a file format by the CPU 39, a VRAM 42 that stores non-compressed digital image data transferred by the SDRAM 35, a video encoder 44 that creates a video signal by adding a synchronizing signal to the non-compressed digital image data stored in the VRAM 42, and an image display control device 43 that converts the video signal created by the video encoder 44 which is digital into an analog signal and amplifies this analog signal. The image display control device 43 provides such control that an image is displayed on the liquid crystal panel 20.

Furthermore, FIG. 2 shows an AF detecting circuit 46 that carries out focusing by detecting the contrast of an image based on an image signal output by the CCD 34 and an AE detecting circuit 45 that detects luminance information on an image based on an image signal output by the CCD 34. FIG. 2 also shows the function selection lever 24, the main switch 23, the cross key 28, the release button 29, and the mode dial 26, all these components being also shown in FIGS. 1A, 1C, and 1D.

The mode dial 26 is operated to select any of six types of modes including a "people photographing" mode, a "manual" mode, a "sports" mode, an "AUTO" mode, a "scenery photographing" mode, and a "night scene photographing" mode. In the "manual" mode and the "AUTO" mode, exposure is controlled according to a set sensitivity or a default sensitivity. In the "people photographing" mode, the "sports" mode, the "scenery photographing" mode, and the "night scene photographing" mode, the exposure is controlled according different program diagrams. The zooming function of the digital camera 1 is used for both optical and electronic zooming. In the cross key 28, shown in FIG. 1, depressing any of those keys to which a "△" mark is attached causes zooming toward a TELE side. Depressing any of those keys to which a "▽" mark is attached causes zooming toward a WIDE side. If it is assumed that the camera has been adjusted to a predetermined zooming position within an optical zooming range. Then, if any of the "△" marks is continuously depressed, a zoom-up operation is performed by protrusion of the lens barrel or the like until an optical zoom-up limit is reached. Once the optical zoom-up limit is passed, the CPU 39 detects the level of depression of that key. Then, an electronic zoom-up operation is performed. With the electronic zoom-up operation, the level of the depression is detected, and an enlargement range on the CCD 34 is arithmetically determined.

Operations of the digital camera 1 will be described below.

The digital camera 1 is provided with the "photographing and recording function" and the "image data reproducing function". With a photographing function of the photographing and recording function, analog image data output by the CCD 34 is converted into digital image data by the A/D converting circuit 33. Then, the digital image data is stored in the SDRAM 35 and then processed by the image signal processing circuit 37. Then, the data passes through the VRAM 42 and is then reprocessed by the video encoder 44 and others. Subsequently, the data is displayed on the liquid crystal panel 20 as an image. In this manner, the image transmitted by the CCD 34 is displayed on the liquid crystal panel as a through image. A recording function of the photographing and recording function and the "image data reproducing function" are unrelated to the present invention. Their description is thus omitted.

Here, a table is shown below which shows ISO sensitivities that can be set for a settable recording image size of the digital camera 1 of the present embodiment. The digital camera 1 has a recordable image size of 6 mega-pixels at a normal sensitivity.

Table 1 shows ISO sensitivities that can be set for 6 mega-pixels (6M), 3 mega-pixels (3M), 1 mega-pixel (1M), and 0.4 mega-pixel (VGA standard), which are all settable recording image sizes. The table indicates that for ISO 800 and ISO 1600 as high sensitivities, the setting of the recording image size is limited to 1 mega-pixel.

TABLE 1

| ISO sensitivity | Recording image size | | | |
| --- | --- | --- | --- | --- |
| | 6 M (2832 × 2128) | 3 M (2048 × 1536) | 1 M (1280 × 960) | VGA (640 × 480) |
| ISO100 | ○ | ○ | ○ | ○ |
| ISO200 | ○ | ○ | ○ | ○ |
| ISO400 | ○ | ○ | ○ | ○ |
| ISO800 | — | — | ○ | — |
| ISO1600 | — | — | ○ | — |

This is because the digital camera 1 of the present embodiment actualizes a high sensitivity by pixel mixture in which a plurality of pieces of luminance information obtained from a plurality of unit light receiving elements constituting the CCD are integrated together so that one new piece of luminance information is formed of every four pieces of luminance information obtained from adjacent four unit light receiving elements. In such a structure, usually, the original recordable pixel size of 6 mega-pixels is reduced to one fourth, thus, if the set recording image size exceeds 1.5 mega-pixels, photographing is carried out only with 1.5 mega-pixels. In the present embodiment, the recordable image size as a result of pixel mixture is 1 mega-pixel instead of 1.5 mega-pixels. Therefore, a high-sensitivity-compatible image size according to the present invention is 1 mega-pixel. Thus, if the set recording image size is 1M, a high sensitivity can be set. Further, as opposed to the conventional art, no high sensitivities can be set if the recording image size is set at 0.4 mega-pixels (VGA standard).

A table is shown below which shows ISO sensitivities that can be set for settable photographing modes of the digital camera 1 of the present embodiment.

Table 2 shows ISO sensitivities that can be set for the settable photographing modes, i.e. the "AUTO" mode, "manual" mode, "person" mode, "sports" mode, "scenery" mode, and "night scene" modes. This table indicates that any of the ISO sensitivities (100–1600) can be selected for the "manual" mode, whereas only the ISO sensitivity 200 can be selected for the other modes.

TABLE 2

| ISO sensitivity | Photographing mode | | | | | |
| --- | --- | --- | --- | --- | --- | --- |
| | Auto | Manual | People | Sports | Scenery | Night scene |
| ISO100 | — | ○ | — | — | — | — |
| ISO200 | ○ | ○ | ○ | ○ | ○ | ○ |
| ISO400 | — | ○ | — | — | — | — |
| ISO800 | — | ○ | — | — | — | — |
| ISO1600 | — | ○ | — | — | — | — |

Figure 3:
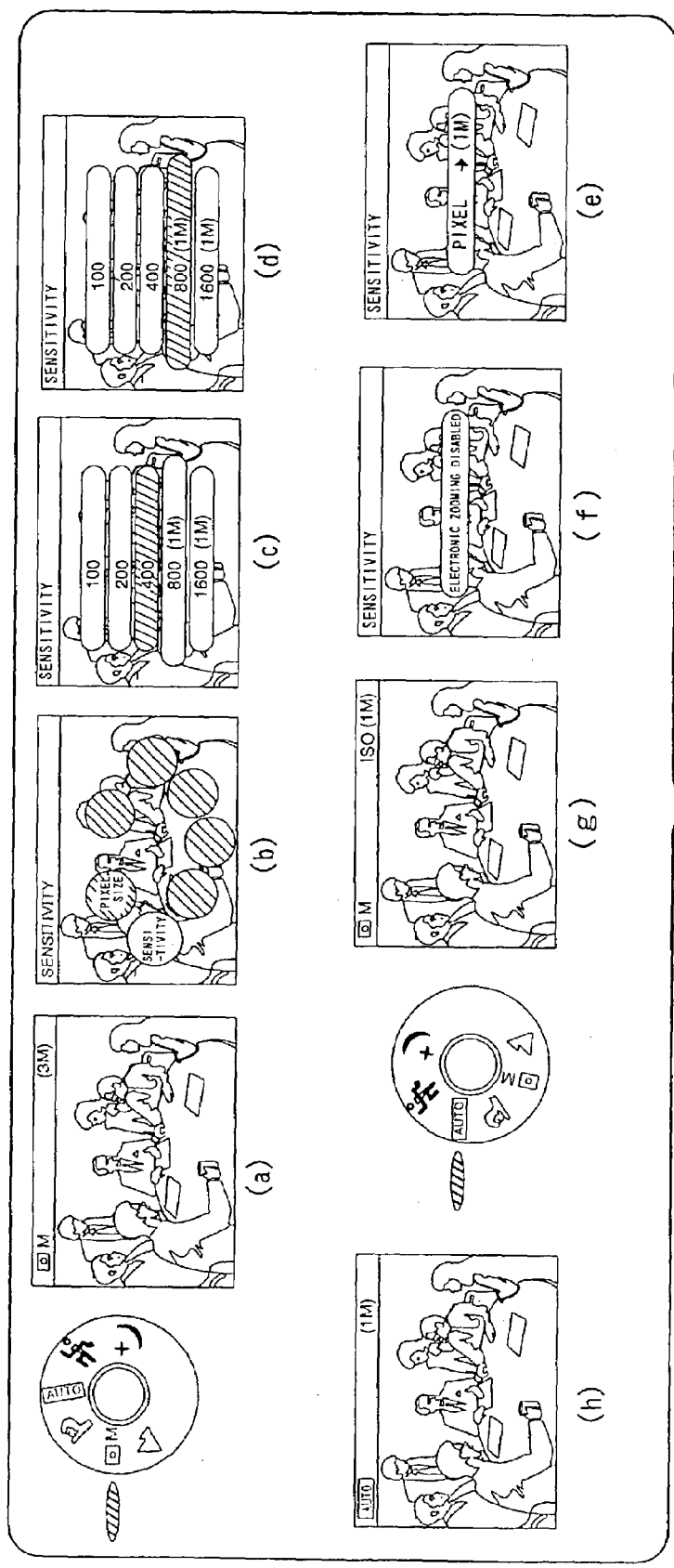
FIG. 3 is a view showing the state of a mode dial of the digital camera of the present embodiment and images displayed on a liquid crystal panel of the digital camera.

FIG. 3 shows the state of the mode dial of the digital camera of the present embodiment and images displayed on the liquid crystal panel of the digital camera.

At the left end of upper stage of FIG. 3, the mode dial is shown set to the "manual" mode. Near the left end of lower stage of FIG. 3, the mode dial is shown set at the "AUTO" mode.

Parts (a) to (h) of FIG. 3 show how the image displayed on the liquid crystal display 20 is altered by operating the menu/OK button 27 and the mode dial 26, shown in FIG. 1.

Operations of the digital camera 1 will be described below in connection with the case in which the main switch 23, shown in FIG. 1, is depressed, the function selection lever 24, shown in FIGS. 1 and 2, is subsequently operated to select the "photographing and recording" function, and the mode dial 26 (see FIG. 1) is then operated to select the "manual" as shown in the left of upper stage of FIG. 3.

First, since the mode dial 26 has been operated to select the "manual" mode, the through image shown in part (a) of FIG. 3 is displayed on the liquid crystal panel 20.

In the right of upper end of part (a) of FIG. 3, "3M" is displayed to indicate that this image has been recorded with a recording image size of 3 mega-pixels. In the left of upper end of part (a) of FIG. 3, a mark for the "manual" mode is displayed. The recording image size of 3 mega-pixels is a default value in the menu "pixel size", described later.

Here, when the menu/OK button 27, shown in FIG. 1 is depressed, the liquid crystal panel 20 displays the image shown in part (b) of FIG. 3.

Part (b) of FIG. 3 shows how plural menus any of which can be selected in the manual mode are displayed. In this case, the menu "sensitivity" has been selected by default. To inform the user of this, the indication "sensitivity" shown in the left of vertically middle stage of the part (b) of FIG. 3 is lighted up, with "sensitivity" also displayed in the left of upper end of the same figure. The indication "pixel size", used to select the menu "pixel size", is shown obliquely upward to the right of the indication "sensitivity" shown in FIG. 3. In the menu "pixel size", the recording image size can be set. The menus other than these are unrelated to the present invention and their description is thus omitted. Any of these manus can be selected by operating the cross key 28, shown in FIG. 1, to move and place the light-up onto an indication representing the desired menu. A decision can be made by depressing the menu/OK button 27.

Part (c) of FIG. 3 shows an image displayed on the liquid crystal display 20 by depressing (deciding) the menu/OK button 27 with the default menu "sensitivity" lighted up and selecting ISO sensitivity 400 from a group of ISO sensitivities 100, 200, 400, 800, and 1600, which can be set in the digital camera 1.

Part (d) of FIG. 3 shows an image displayed on the liquid crystal panel when the light-up is moved from ISO sensitivity 400 to ISO sensitivity 800 in order to select the ISO sensitivity 800, which is a high sensitivity. This movement can be effected by operating the cross key 28, shown in FIG. 1. Description will be given below of the meaning of the indication "(1M)", located on the right of each of the indications "800" and "1600".

Part (e) of FIG. 3 shows that the message "pixel→(1M)" is displayed on the liquid crystal panel, the message indicating that since the ISO sensitivity 800 is selected, pixel mixture is carried out to reduce the recordable image size from 3 mega-pixels (see part (a) of FIG. 3) to 1 mega-pixel. Thus, this high sensitivity setting changes the recording image size of 3 mega-pixels, which has been selected by default, to 1 mega-pixel. This message is continuously displayed until the menu/OK button 27, shown in FIG. 1, is depressed.

Part (f) of FIG. 3 shows an image displayed on the liquid crystal panel 20 after the menu/OK button 27 has been depressed in response to the message in part (e) of FIG. 3.

Here, the electronic zooming function of the digital camera 1 will be described with reference to the table shown below.

Table 3 shows selectable combinations of the recording image sizes and ISO sensitivities with which the electronic zooming function of the digital camera 1 can be used.

TABLE 3

| ISO sensitivity | Recording image size | | | |
| --- | --- | --- | --- | --- |
| | 6 M (2832 × 2128) | 3 M (2048 × 1536) | 1 M (1280 × 960) | VGA (640 × 480) |
| ISO100 | — | ○ | ○ | ○ |
| ISO200 | — | ○ | ○ | ○ |
| ISO400 | — | ○ | ○ | ○ |
| ISO800 | — | — | — | — |
| ISO1600 | — | — | — | — |

As shown in Table 3, with the digital camera 1, when the ISO sensitivity 800 or 1,600 is selected, the electronic zooming function is disabled for all recording image sizes. Furthermore, even with an ISO sensitivity of less than 800, if the recording image size of 6 mega-pixels is selected, the electronic zooming function is disabled.

This is because the electronic zooming function of the digital camera 1 is enabled only if the image size, determined by an enlargement range set on the CCD, is larger than 1 mega-pixel in order to prevent image quality from being degraded. If the ISO sensitivity 800 or more is selected, the recordable image size on the CCD is reduced to 1 mega-pixel. When the already selected recording image size is 6 or 3 mega-pixels, the recording image size is changed to 1 mega-pixel. Accordingly, when a high sensitivity is set, the recordable image size becomes the same as the recording image size. Consequently, the electronic zooming function is disabled. If the ISO sensitivity is less than 800 and the selected recording image data has a size of 6 mega-pixels, then the electronic zooming is also disabled for the same reason. Further, if the selected recording image data has a size of 0.4 mega-pixel (VGA standard) and the ISO sensitivity is 800 or more, the recording image size is changed to 1 mega-pixel as described previously. Consequently, the electronic zooming function is disabled. Furthermore, if the ISO sensitivity is less than 800 and the selected recording image data has a size of 3 mega-pixels or 1 mega-pixel, electronic zooming is possible in which the enlargement range is from 6 mega-pixels, corresponding to the entire CCD, to the pixel size of the selected recording image data. If the ISO sensitivity is less than 800 and the selected recording image data has a size of 0.4 mega-pixel, electronic zooming is possible between 6 mega-pixels, corresponding to the entire CCD, and 1 mega pixel.

Referring back to part (f) of FIG. 3, further description will be given.

When the menu/OK button 27 is depressed to end the display of the message "pixel→(1M)", shown in part (e) of FIG. 3, the message "Electronic zooming disabled", shown in part (f) of FIG. 3, is displayed on the liquid crystal panel 20, the message indicating that the electronic zooming function is disabled because the high ISO sensitivity has been selected.

The display of the message shown in part (f) of FIG. 3 can be ended by depressing the menu/OK button 27.

When the display of the message shown in part (f) of FIG. 3 is ended using the menu/OK button 27, the indication "ISO", indicating that a high ISO sensitivity has been selected, is displayed close to the center of upper end of part (g) of FIG. 3 together with the indication "1M", the current recording image size. Further, a mark indicating the manual mode, the currently selected mode, is displayed in the left of upper end of part (g) of FIG. 3.

Here, when the mode dial 26 is set to "AUTO" as shown close to the left end of lower stage of FIG. 3, the indication "ISO", displayed in part (g) of FIG. 3, is omitted as shown in part (g) of FIG. 3. This is because the photographing mode has been switched from "manual" mode to "AUTO" mode, thus setting sensitivity to the default ISO sensitivity value of 200 as shown in Table 2.

Here, when the mode dial is switched from "AUTO" mode to "manual" mode, sensitivity is set to the normal ISO sensitivity value of 400, which had been selected immediately before a high sensitivity was set in the last "manual" mode.

Figure 4:
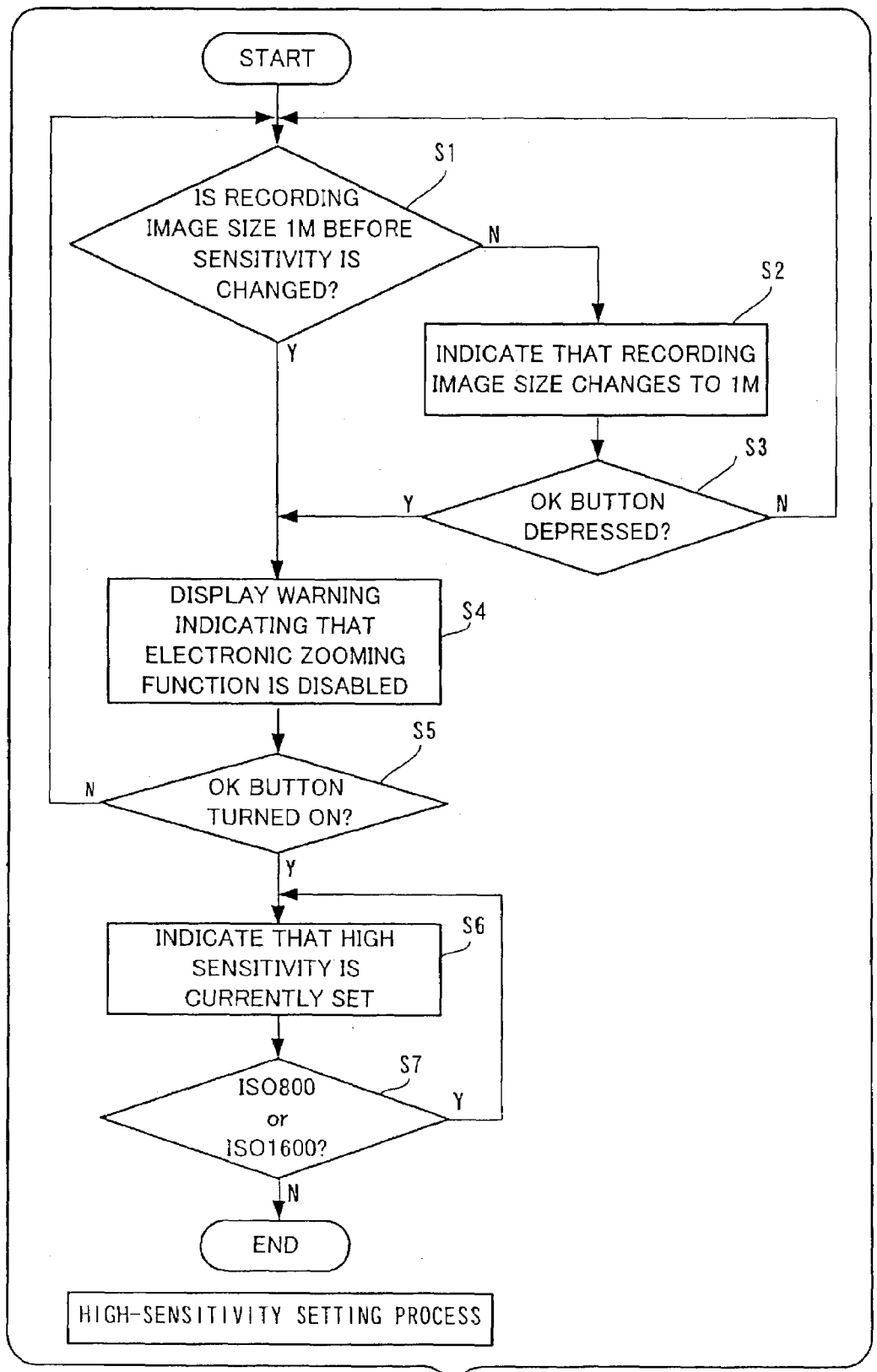
FIG. 4 is a flow chart of a routine which is activated when ISO 800 or ISO 1600 is selected from the menu "sensitivity" in a "manual" mode and which is executed by a CPU, shown in FIG. 2.

FIG. 4 is a flow chart of a routine which is activated when the ISO 800 or the ISO 1600 is selected from the menu "sensitivity" in the "manual" mode and which is executed by the CPU, shown in FIG. 2.

At step S1 of the routine "high sensitivity setting process", shown in FIG. 4, it is determined whether or not the recording image size set before a high sensitivity higher than the ISO 800 is 1 mega-pixel.

At step S1, if it is determined that the recording image size is not 1 mega-pixel, the routine proceeds to step S2 to display the message "pixel→(1M)", meaning that the recording image size has been changed to 1 mega-pixel. Subsequently, the routine proceeds to step S3 to wait for the menu/OK button 27 to be depressed.

At step S3, if the menu/OK button 27 is not depressed, the routine returns to step S1. If the menu/OK button 27 is depressed, the routine proceeds to step S4.

If it is determined at step S1 that the recording image size is 1 mega-pixel, the routine proceeds to step S4 to display the message "Electronic zooming disabled", meaning that the electronic function is disabled. Subsequently, the routine proceeds to step S5 to wait for the menu/OK button 27 to be depressed.

At step S5, if the menu/OK button 27 is not depressed, the routine returns to step S1. If the menu/OK button 27 is depressed, the routine proceeds to step S6.

At step S6, "ISO" is displayed meaning that a high sensitivity is currently set. Subsequently, the routine proceeds to step S7 to determine whether or not the current sensitivity is still ISO 800 or more.

If it is determined at step S7 that sensitivity is ISO 800 or more, step S6 is repeated. If it is determined at step S7 that sensitivity is less than ISO 800, the routine is ended.

Figure 5:
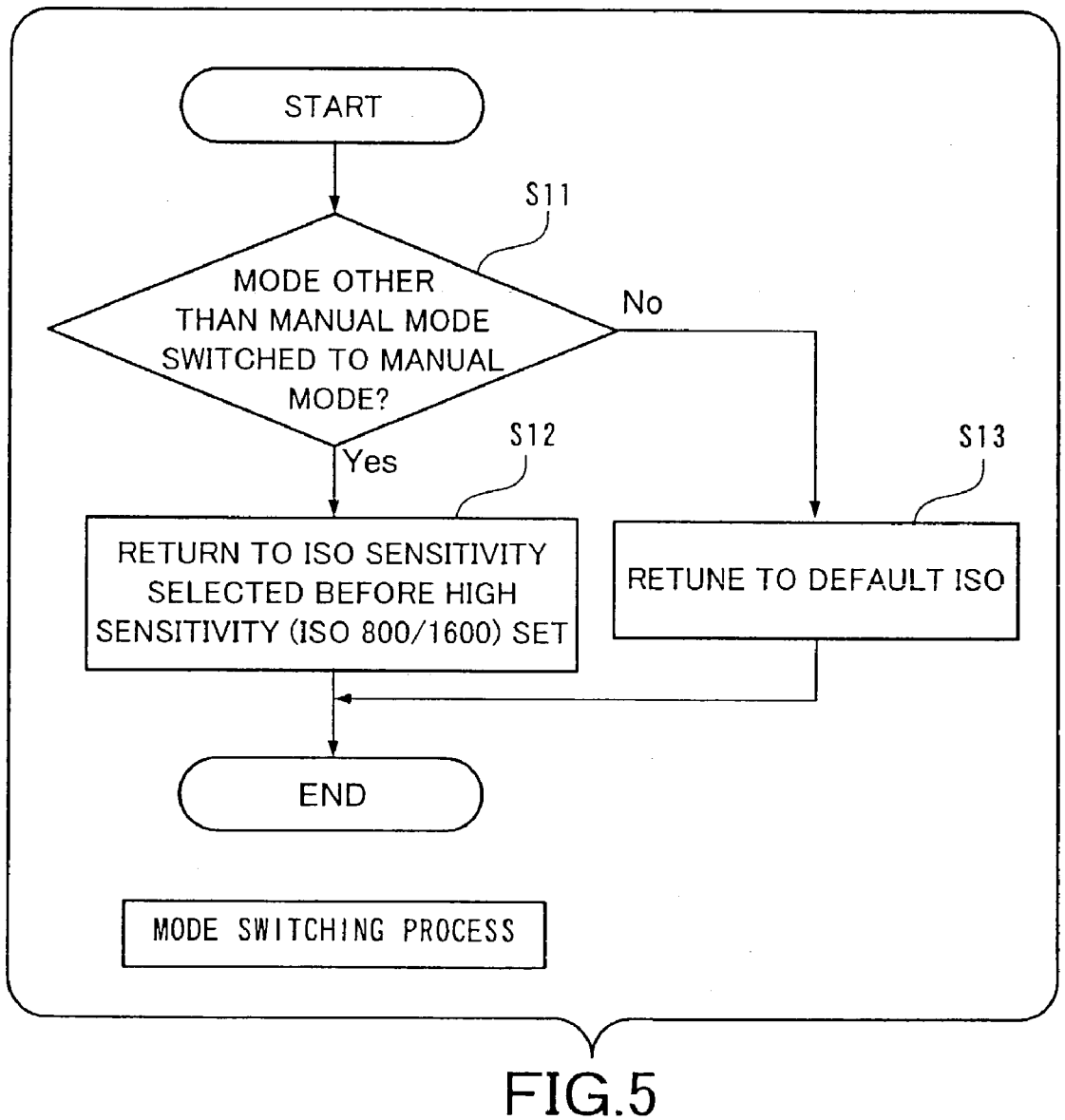
FIG. 5 is a flow chart of the routine "mode switching process" activated when the mode dial is operated to switch a photographing mode.

FIG. 5 is a flow chart of the routine "mode switching process" activated when the mode dial 26 is operated to switch the photographing mode.

At step S11 of the routine "mode switching process", it is determined whether this mode switching is from one of the six types of photographing modes which is other than the "manual" mode to the "manual" mode.

If it is determined at step S11 that the mode switching is not from a mode other than the "manual" mode to the "manual" mode, i.e. from a mode other than the "manual" mode to a mode other than the "manual" mode, or from the "manual" mode to a mode other than the "manual" mode then the routine proceeds to step S13 to set the ISO 200 (see Table 2), the default sensitivity.

If it is determined at step S11 that the mode switching is from a mode other than the "manual" mode to the "manual" mode, the routine proceeds to step S12 to set the normal sensitivity of ISO 400 (see part (c) of FIG. 3), which had been set immediately before a high sensitivity was set in the last "manual" mode.

As described above, with the digital camera 1 of the present embodiment, when a high sensitivity of ISO 800 or more is set, if the recording image size set before this high sensitivity is set exceeds 1 mega-pixel, then the recording image size is changed to 1 mega-pixel. Further, the message meaning this change remains displayed until a response is made by the predetermined switch.

Furthermore, with the digital camera 1 of the present embodiment, if a high sensitivity of ISO 800 or more is set, the message meaning that the electronic zooming function is disabled remains displayed until a response is made by the predetermined switch. Subsequently, the mark meaning this remains displayed while this high sensitivity remains set.

Moreover, with the digital camera 1 of the present embodiment, whenever the "manual" mode is switched to one of the six types of photographing modes which is other than the "manual" mode, sensitivity is set to the ISO 200.

On the other hand, with the digital camera 1 of the present embodiment, if a high sensitivity of ISO 800 or more is set in the "manual" mode and then a mode other than the "manual" mode is selected, sensitivity is set to the ISO 200. Subsequently, when the "manual" mode is selected again, the normal sensitivity of ISO 400 is set, which had been selected immediately before a high sensitivity was set in the last "manual" mode.

Thus, with the digital camera 1 of the present embodiment, the user realizes before photographing or a photographing operation that the recording image size has been unintentionally changed or the electronic zooming function is disabled because a high sensitivity has been set. Furthermore, a set sensitivity value is prevented from being mistakenly kept between different photographing modes.

Now, an embodiment common to a fifth and sixth digital cameras of the present invention will be described.

The appearance and internal configuration of a digital camera of the present embodiment are the same as those of the digital camera 1, described above. Thus, their indication in figures and description are omitted. For the functions of the digital camera, the same types of functions as those provided in the digital camera 1 will be described using the reference numerals and names used in the description of the digital camera 1.

Operations of the digital camera will be described.

The digital camera is provided with a "photographing and recording function" and an "image data reproducing function". For a photographing function of the photographing and recording function, analog image data output by the CCD 34 is first converted into digital image by the A/D converting circuit 33. Then, the digital image data is stored in the SDRAM 35 and then processed by the image signal processing circuit 37. The data then passes through the VRAM 42 and is then reprocessed by the video encoder 44 and others. Subsequently, the data is displayed on the liquid crystal panel 20 as an image. In this manner, the image transmitted by the CCD 34 is displayed on the liquid crystal panel as a through image. A recording function of the photographing and recording function and the "image data reproducing function" are unrelated to the present invention. Their description is thus omitted.

Here, description of the ISO sensitivities, which can be set for the settable recording image sizes of the digital camera of the present embodiment, is the same as that given with reference to Table 1 for the digital camera 1. This description is thus omitted.

Further, description of the ISO sensitivities, which can be set for the settable photographing modes of the digital camera of the present embodiment, is the same as that given with reference to Table 1 for the digital camera 1. This description is thus omitted.

Figure 6:
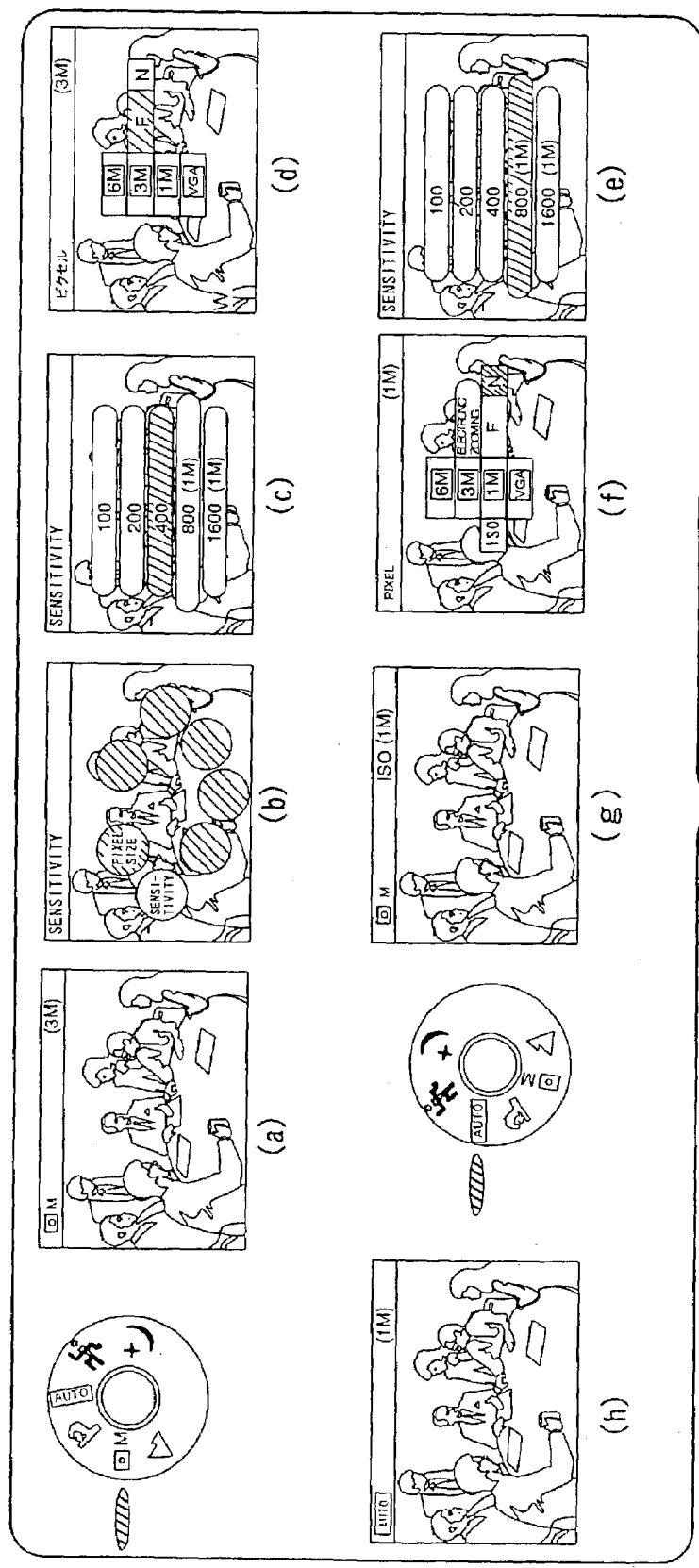
FIG. 6 is a view showing the state of the mode dial of the digital camera of the present embodiment and images displayed on the liquid crystal panel of the digital camera.

FIG. 6 shows the state of the mode dial of the digital camera of the present embodiment and images displayed on the liquid crystal panel of the digital camera.

At the left end of upper stage of FIG. 6, the mode dial is shown set to the "manual" mode. Near the left end of lower stage of FIG. 6, the mode dial is shown set at the "AUTO" mode.

Parts (a) to (h) of FIG. 6 show how the image displayed on the liquid crystal display 20 is altered by operating the menu/OK button 27 and the mode dial 26, shown in FIG. 1.

Operations of the digital camera will be described below in connection with the case in which the main switch 23, shown in FIG. 1, is depressed, the function selection lever 24, shown in FIGS. 1 and 2, is subsequently operated to select the "photographing and recording" function, and the mode dial 26 (see FIG. 1) is then operated to select the "manual" as shown in the left of upper stage of FIG. 6.

First, since the mode dial 26 has been operated to select the "manual" mode, the through image shown in part (a) of FIG. 6 is displayed on the liquid crystal panel 20.

In the right of upper end of part (a) of FIG. 6, "3M" is displayed to indicate that this image has been recorded with a recording image size of 3 mega-pixels. In the left of upper end of part (a) of FIG. 3, a mark indicating that the "manual" mode has been selected is displayed. The recording image size of 3 mega-pixels is a default value in the menu "pixel size", described later.

Here, when the menu/OK button 27, shown in FIG. 1 is depressed, the liquid crystal panel 20 displays the image shown in part (b) of FIG. 6.

Part (b) of FIG. 6 shows how a plurality of menus any of which can be selected in the "manual" mode are displayed. In this case, the menu "sensitivity" has been selected by default. To inform the user of this, the indication "sensitivity" shown in the left of vertically middle stage of the part (b) of FIG. 6 is lighted up, with "sensitivity" also displayed in the left of upper end of the same figure. The indication "pixel size", used to select the menu "pixel size", is shown obliquely upward to the right of the indication "sensitivity" shown in FIG. 6. In the menu "pixel size", the recording image size can be set. The menus other than these are unrelated to the present invention and the indication and description of their contents are thus omitted. Any of these manus can be selected by operating the cross key 28, shown in FIG. 1, to move the light-up onto an indication representing the desired menu. A decision can be made by depressing the menu/OK button 27.

Part (c) of FIG. 6 shows an image displayed on the liquid crystal display 20 by depressing (deciding) the menu/OK button 27 with the default menu "sensitivity" lighted up as shown in part (b) of FIG. 6 and selecting the ISO sensitivity 400 from the group of ISO sensitivities 100, 200, 400, 800, and 1600, which can be set in the digital camera.

Part (d) of FIG. 6 shows an image displayed on the liquid crystal panel when the menu/OK button 27 is depressed (decided) with the ISO sensitivity 400 remaining selected to return to the menu selection screen shown in part (b) of FIG. 6 and then the menu "pixel size" is selected and the menu/OK button 27 depressed.

Part (d) of FIG. 6 shows that a recording image size of 3 mega-pixel (3M) has been selected. At the right side of an indication (in this case, "3M") representing the selected recording image size, "F" and "N" are displayed which are used to determine the level at which image data recorded in the SDRAM 35 with this recording image size is subsequently compressed and recorded on the recording media 40, shown in FIG. 1. The indication "F" represents FINE, while the indication "N" represents NORMAL. The data size after compression is larger with FINE than with NORMAL. Selecting "F" increases the amount of data compared to selection of "N" but hinders images from being degraded when compressed data is expanded. In this case, the indicator 'F' is selected by default.

Part (e) of FIG. 6 shows an image on the liquid crystal panel displayed when the menu "sensitivity" is selected back in the menu screen to select a high sensitivity of ISO sensitivity 800 and then the ISO 800, a high sensitivity, is selected. The meaning of the indication "(1M)", located at the right side of the indications "800" and "1600", will be described later.

Part (f) of FIG. 6 shows an image displayed on the liquid crystal panel 20 when the menu/OK button 27 is depressed in order to decide the selection of the ISO sensitivity 800, shown in part (e) of FIG. 6, and then the menu "pixel size" is selected again.

As described previously, when a high sensitivity is set in the digital camera, the settable recording image size is 1 mega-pixel only. Thus, part (f) of FIG. 6 shows the indication "ISO" indicating this, at the left of "1M". Further, "F" and "N" are displayed at the right side of the indication "1M". In this case, the indication "N" has been selected in place of the default indication "F".

Furthermore, part (f) of FIG. 6 shows the message "Electronic zooming NG".

In this case, selectable combinations of the recording image sizes and ISO sensitivities with which the electronic zooming function of the digital camera can be used are the same as those described with reference to Table 3 for the digital camera 1. Their description is thus omitted.

Referring back to part (f) of FIG. 6, further description will be given.

The message "Electronic zooming NG", shown in part (f) of FIG. 6, indicates that the electronic zooming function is disabled because a high sensitivity setting has been selected in part (e) of FIG. 6.

Part (g) of FIG. 6 shows an image displayed on the liquid crystal panel 20 when the menu/OK button 27 is depressed in the state shown in part (f) of FIG. 6. The indication "ISO", indicating that a high ISO sensitivity has been selected, is shown close to the center of upper end of part (g) of FIG. 6 together with the indication "1M", the current recording image size. Further, a mark indicating the manual mode, the currently selected mode, is displayed in the left of upper end of part (g) of FIG. 6.

Here, when the mode dial 26 is set to "AUTO" as shown close to the left end of lower stage of FIG. 6, the indication "ISO", displayed in part (g) of FIG. 6, is omitted as shown in part (h) of FIG. 6. This is because the photographing mode has been switched from "manual" mode to "AUTO" mode, thus setting sensitivity to the default ISO sensitivity value of 200 as shown in Table 2.

Here, when the mode dial is switched from "AUTO" mode to "manual mode" again, sensitivity is set to the ISO sensitivity value of 400, which had been selected immediately before a high sensitivity was set in the "manual" mode.

Figure 7:
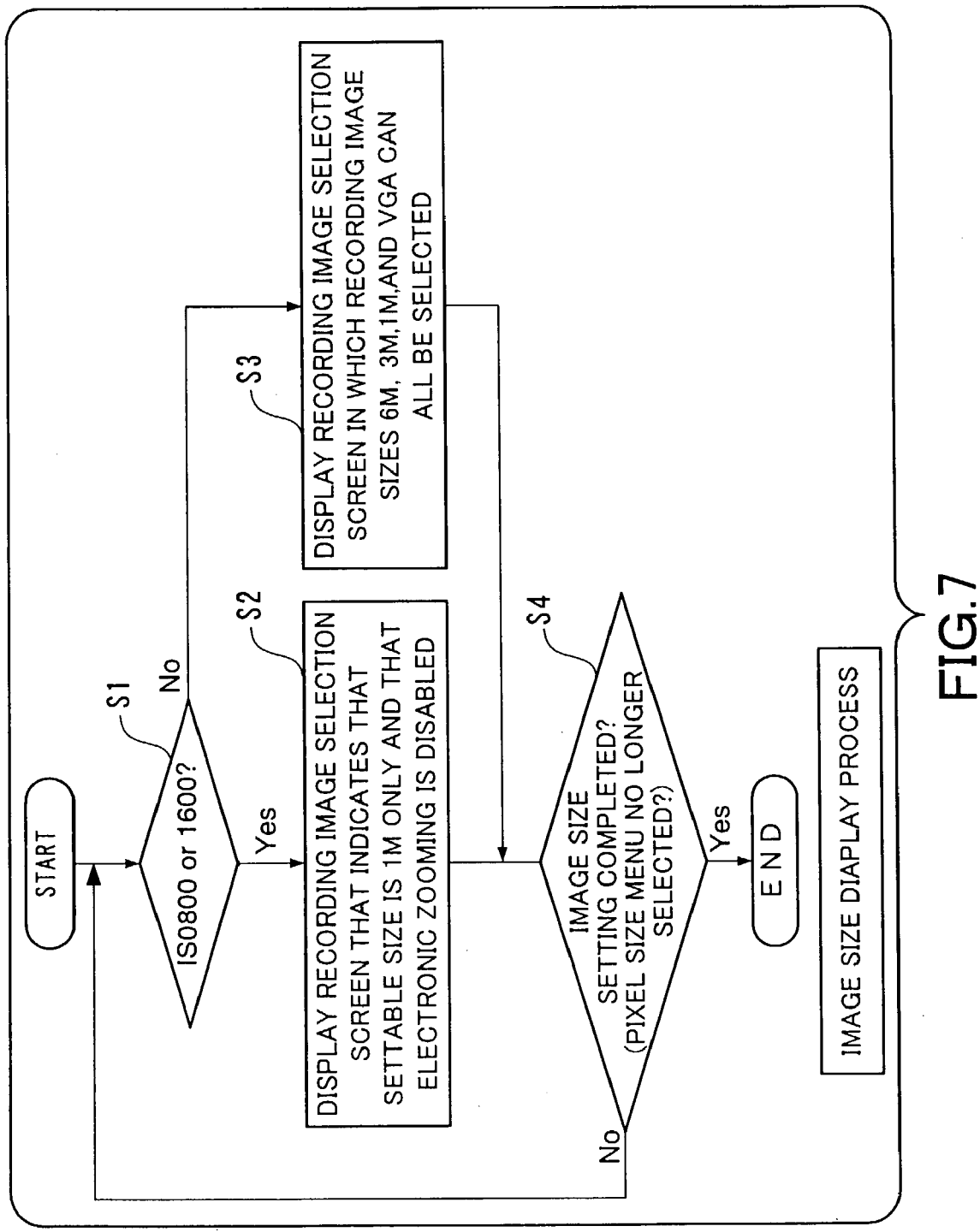
FIG. 7 is a flow chart of a routine which is activated when the menu "pixel size" is selected in the "manual" mode and which is executed by the CPU, shown in FIG. 2.

FIG. 7 is a flow chart of a routine which is activated when the menu "pixel size" is selected in the "manual" mode and which is executed by the CPU, shown in FIG. 2.

At step S1 of the routine "image size display process", shown in FIG. 7, it is determined whether or not a high sensitivity of ISO 800 or more is currently selected.

If it is determined at step S1 that a high sensitivity has been set, the routine proceeds to step S2 to display "ISO", indicating that the recording image size is limited to 1 mega-pixel. Subsequently, the routine proceeds to step S4 to determine whether or not the menu "pixel size" remains selected.

If it is determined at step S4 that this menu remains selected, the routine returns to step S1. If it is determined at step S4 that this menu is no longer selected, the routine ends.

On the other hand, if it is determined at step S1 that no high sensitivities are currently selected, the routine proceeds to step S3 to display "F" and "N" at the right side of an indication (e.g. "3M") representing a recording image size selected by default with ISO not displayed. Subsequently, the routing proceeds to step S4. The subsequent steps are as described above, and their description is thus omitted.

Description of the routine "mode switching process", activated when the mode dial 26 is operated to switch the photographing mode, is the same as that given with reference to FIG. 5 for the digital camera 1. This description is thus omitted.

As described above, with the digital camera of the present embodiment, when a high sensitivity of ISO 800 or more is set, the mark is displayed on the screen in which the recording image size is set, the mark indicating that the settable recording image size is limited to 1 mega-pixel.

Further, with the digital camera of the present embodiment, when a high sensitivity of ISO 800 or more is set, the mark is displayed on the screen in which the recording image size is set, the message indicating that the electronic zooming function is disabled.

Furthermore, with the digital camera of the present embodiment, whenever the "manual" mode is switched to one of the six types of photographing modes which is other than the "manual" mode, sensitivity is set to the ISO 200.

Moreover, with the digital camera of the present embodiment, if a high sensitivity of ISO 800 or more is set in the manual mode in which the ISO sensitivity 400 has been set and then a mode other than the "manual" mode is set, then sensitivity is set to the ISO 200. Subsequently, if the "manual" mode is selected again, the normal sensitivity of ISO 400 is set, which had been set immediately before a high sensitivity was set in the "manual" mode.

Thus, with the digital camera of the present embodiment, the user realizes before photographing that the recording image size is limited or the electronic zooming function is disabled because a high sensitivity has been set. Furthermore, a set sensitivity value is prevented from being mistakenly kept between different photographing modes.

What is claimed is:

1. A digital camera which obtains image data representing an object by forming an image of the object on a solid imaging device comprising a set of a plurality of two-dimensionally arranged unit light receiving elements, the digital camera controlling exposure according to a set sensitivity, the digital camera comprising:

a sensitivity setting operation member which sets sensitivity;

an image size setting operation member which sets a recording image size;

a pixel mixing section which operates if the sensitivity setting operation member is operated to set a predetermined sensitivity, to execute a pixel mixing process on a plurality of pieces of luminance information obtained from the plurality of unit light receiving elements constituting the solid imaging device, the pixel mixing process comprising integrating the plurality of pieces of luminance information together so that one new piece of luminance information is formed of every predetermined number of pieces of luminance information obtained from a predetermined number of adjacent unit light receiving elements, the pixel mixing section thus reducing a recordable image size to a predetermined high-sensitivity-compatible image size to realize the predetermined high sensitivity;

an image size setting section which sets the recording image size according to an operation of the image size setting operation member and if a recording image size larger than the high-sensitivity-compatible image size has previously been set, changes the recording image size to the high-sensitivity-compatible image size in response to setting of the predetermined high sensitivity carried out by operating the high-sensitivity setting operation member; and a display section which indicates that the recording image size has been changed to the high-sensitivity-compatible image size if the image size setting section changes the recording image size to the high-sensitivity-compatible image size in response to the setting of the predetermined high sensitivity carried out by operating the sensitivity setting operation member.

2. A digital camera which obtains image data representing an object by forming an image of the object on a solid imaging device comprising a set of a plurality of two-dimensionally arranged unit light receiving elements, the digital camera controlling exposure according to a set sensitivity, the digital camera comprising:

a sensitivity setting operation member which sets sensitivity;

an image size setting operation member which sets a recording image size;

a pixel mixing section which operates if the sensitivity setting operation member is operated to set a predetermined sensitivity, to execute a pixel mixing process on a plurality of pieces of luminance information obtained from the plurality of unit light receiving elements constituting the solid imaging device, the pixel mixing process comprising integrating the plurality of pieces of luminance information together so that one new piece of luminance information is formed of every predetermined number of pieces of luminance information obtained from a predetermined number of adjacent unit light receiving elements, the pixel mixing section thus reducing a recordable image size to a predetermined high-sensitivity-compatible image size to realize the predetermined high sensitivity;

an image size setting section which sets the recording image size according to an operation of the image size setting operation member and if a recording image size larger than the high-sensitivity-compatible image size has previously been set, changes the recording image size to the high-sensitivity-compatible image size in response to setting of the predetermined high sensitivity carried out by operating the high-sensitivity setting operation member; and a display section which indicates that the predetermined high sensitivity has been set during a state in which the predetermined high sensitivity remains set.

3. A digital camera which obtains image data representing an object by forming an image of the object on a solid imaging device comprising a set of a plurality of two-dimensionally arranged unit light receiving elements, the digital camera controlling exposure according to a set sensitivity, the digital camera comprising:

a sensitivity setting operation member which sets sensitivity;

an image size setting operation member which sets a recording image size;

a pixel mixing section which operates if the sensitivity setting operation member is operated to set a predetermined sensitivity, to execute a pixel mixing process on a plurality of pieces of luminance information obtained from the plurality of unit light receiving elements constituting the solid imaging device, the pixel mixing process comprising integrating the plurality of pieces of luminance information together so that one new piece of luminance information is formed of every predetermined number of pieces of luminance information obtained from a predetermined number of adjacent unit light receiving elements, the pixel mixing section thus reducing a recordable image size to a predetermined high-sensitivity-compatible image size to realize the predetermined high sensitivity;

an image size setting section which sets the recording image size according to an operation of the image size setting operation member and if a recording image size larger than the high-sensitivity-compatible image size has previously been set, changes the recording image size to the high-sensitivity-compatible image size in response to setting of the predetermined high sensitivity carried out by operating the high-sensitivity setting operation member;

an electronic zoom operation section which implements an electronic zoom function in which the high-sensitivity-compatible image size is a maximum enlarged size; and a display section which indicates that the electronic zoom function is disabled if the image size setting section changes the recording image size to the high-sensitivity-compatible image size in response to the setting of the predetermined high sensitivity carried out by operating the sensitivity selling operation member.

4. A digital camera which obtains image data representing an object by forming an image of the object on a solid imaging device comprising a set of a plurality of two-dimensionally arranged unit light receiving elements, the digital camera controlling exposure according to a set sensitivity, the digital camera comprising:

a sensitivity setting operation member which sets sensitivity;

an image size selling operation member which sets a recording image size;

a pixel mixing section which operates if the sensitivity setting operation member is operated to set a predetermined sensitivity, to execute a pixel mixing process on a plurality of pieces of luminance information obtained from the plurality of unit light receiving elements constituting the solid imaging device, the pixel mixing process comprising integrating the plurality of pieces of luminance information together so that one new piece of luminance information is formed of every predetermined number of pieces of luminance information obtained from a predetermined number of adjacent unit light receiving elements, the pixel mixing section thus reducing a recordable image size to a predetermined high-sensitivity-compatible image size to realize the predetermined high sensitivity;

an image size setting section which has a setting screen which displays a settable recording image size when the image size setting operation member is operated to set the recording image size, the image size setting section changing display on the setting screen in connection with the operation of the image size setting operation member to set the recording image size according to the operation of the image size setting operation member, and wherein the image size setting section indicates on the setting screen that only the high-sensitivity-compatible image size can be set on the setting screen if the sensitivity setting operation member has been operated to set the predetermined high sensitivity.

5. The digital camera according to claim 4, wherein the digital camera controls exposure on the basis of a program diagram corresponding to a selected one of a plurality of photographing modes with different program diagrams, wherein the digital camera comprises a photographing mode selecting operation member used to select a photographing mode, wherein the pixel mixing section operates if the photographing mode selecting operation member is operated to select a predetermined high-sensitivity-compatible photographing mode and the high-sensitivity setting operation member is operated to set the predetermined high sensitivity, and wherein the digital camera comprises a sensitivity setting section which sets sensitivity according to an operation of the sensitivity setting operation member, and returns sensitivity to a predetermined initial sensitivity value if the photographing mode selecting operation member is operated to select a photographing mode different from a previously selected high-sensitivity-compatible photographing mode.

6. A digital camera which obtains image data representing an object by forming an image of the object on a solid imaging device comprising a set of a plurality of two-dimensionally arranged unit light receiving elements, the digital camera controlling exposure according to a set sensitivity, the digital camera comprising:

a sensitivity setting operation member which sets sensitivity;

an image size setting operation member which sets a recording image size;

a pixel mixing section which operates if the sensitivity setting operation member is operated to set a predetermined sensitivity, to execute a pixel mixing process on a plurality of pieces of luminance information obtained from the plurality of unit light receiving elements constituting the solid imaging device, the pixel mixing process comprising integrating the plurality of pieces of luminance information together so that one new piece of luminance information is formed of every predetermined number of pieces of luminance information obtained from a predetermined number of adjacent unit light receiving elements, the pixel mixing section thus reducing a recordable image size to a predetermined high-sensitivity-compatible image size to realize the predetermined high sensitivity;

an image size setting section which has a setting screen which displays a settable recording image size when the image size setting operation member is operated to set the recording image size, the image size setting section changing display on the setting screen in connection with the operation of the image size setting operation member to set the recording image size according to the operation of the image size setting operation member; and an electronic zoom operation section which implements an electronic zoom function in which the high-sensitivity-compatible image size is a maximum enlarged size, and wherein the image size setting section indicates on the setting screen that the electronic zoom function is disabled if the sensitivity setting operation member has been operated to set the predetermined high sensitivity.

7. The digital camera according to claim 5, wherein the digital camera controls exposure on the basis of a program diagram corresponding to a selected one of a plurality of photographing modes with different program diagrams, wherein the digital camera comprises a photographing mode selecting operation member used to select a photographing mode, wherein the pixel mixing section operates if the photographing mode selecting operation member is operated to select a predetermined high-sensitivity-compatible photographing mode and the high-sensitivity setting operation member is operated to set the predetermined high sensitivity, and wherein the digital camera comprises a sensitivity setting section which sets sensitivity according to an operation of the sensitivity setting operation member, and returns sensitivity to a predetermined initial sensitivity value if the photographing mode selecting operation member is operated to select a photographing mode different from a previously selected high-sensitivity-compatible photographing mode.

* * * * *